United States Patent [19]
Molari, Jr.

[11] 4,328,277
[45] * May 4, 1982

[54] IMPACT RESISTANT LAMINATE

[75] Inventor: Richard E. Molari, Jr., Pittsfield, Mass.

[73] Assignee: General Electric Company, Pittsfield, Mass.

[ * ] Notice: The portion of the term of this patent subsequent to Jun. 13, 1992, has been disclaimed.

[21] Appl. No.: 158,486

[22] Filed: Jun. 11, 1980

Related U.S. Application Data

[63] Continuation of Ser. No. 862,775, Dec. 21, 1977, abandoned, which is a continuation of Ser. No. 650,446, Jan. 19, 1976, abandoned, which is a continuation-in-part of Ser. No. 464,603, Apr. 26, 1974, abandoned.

[51] Int. Cl.$^3$ .................. B32B 27/36; B32B 7/02
[52] U.S. Cl. ....................... 428/215; 428/336; 428/335; 428/911; 428/412
[58] Field of Search ............... 428/412, 336, 335, 215

[56] References Cited

U.S. PATENT DOCUMENTS

| | | | |
|---|---|---|---|
| 3,549,476 | 6/1970 | Dietzel et al. | 428/215 |
| 3,622,440 | 11/1971 | Snedeker et al. | 428/215 |
| 3,832,419 | 7/1974 | Merritt | 428/412 |
| 4,027,072 | 5/1977 | Molari | 428/412 |

*Primary Examiner*—George F. Lesmes
*Assistant Examiner*—E. Rollins Buffalow
*Attorney, Agent, or Firm*—Hedman, Casella, Gibson & Costigan

[57] ABSTRACT

Improved impact or shock resistant laminates comprising a plurality of laminae including a back polycarbonate lamina opposite the direction of impact or shock, such polycarbonate lamina having a relatively brittle overlying or exposed layer or coating opposite the direction of impact, are provided by controlling the thickness of the coated polycarbonate layer opposite the impact or shock receiving surface, such control reducing failure and spalling of the polycarbonate surface opposite the impact or shock receiving surface.

10 Claims, No Drawings

IMPACT RESISTANT LAMINATE

This is a continuation of application Ser. No. 862,775 filed Dec. 21, 1977 which in turn is a continuation of application Ser. No. 650,446 filed Jan. 19, 1976 which in turn is a continuation-in-part application of Ser. No. 464,603 filed Apr. 26, 1974 and all now abandoned.

This invention relates to improved impact resistant laminates. More particularly, it relates to such laminates having a plurality of layers or laminae including a back polycarbonate layer opposite the direction of impact or shock, such polycarbonate layer having thereon an exposed relatively brittle coating. The laminates are particularly characterized by control of the thickness of the back polycarbonate which reduces spalling or other failure of the back or downstream polycarbonate surface when the laminates are subject to impact.

The use of so-called safety glazing or penetration resistant glazing for window, windshields and the like utilizing polycarbonate resin layers as a structural component is well known. For example, glass polycarbonate resin laminates are described in U.S. Pat. No. 3,666,614, the glass and polycarbonate being cohered together using an ethylene-vinyl acetate copolymer. In U.S. Pat. No. 3,520,768 there are described laminates of relatively thick glass having a comparatively thin polycarbonate foil as the cohering material. It is also known to utilize certain polysiloxane-polycarbonate block copolymers described more particularly hereinafter as the adhesive layers. It is normal practice in constructing certain such laminates to utilize glass or relatively hard solid resinous materials as the impact shock receiving layers while utilizing polycarbonate as the back or inner or downstream layer or that presented to the person or object being protected. In those cases where polycarbonate is used as a layer of a laminate, it is often, because of the relative softness of the polycarbonate, protected, especially on its exposed surface, with a mar- or scratch-resistant and transparency preserving layer usually less than 2 mils thick and preferably from about 0.05 to 1 mils thick. The minimum thickness is restricted only by current application technology and the desired durability of the mar-resistant coating. Maximum acceptable coating thickness is a function of the relative brittleness of the mar-resistant finish. The inner surface can also be so coated to prevent marring during lay-up and the like. In general, such mar-resistant layers, which are well known, can be metal oxides; modified melamines, ultraviolet hardenable organics such as acrylated monomers or mixtures of these monomers with acrylate-modified polymeric resins; inorganic glasses such as silica or alumina; polyurethanes; silicone resins with recurring organic groups such as polymethyl methacrylate; polyamide ester resins; and ion-beam deposited carbon, among others, are harder and relatively more brittle than the underlying polycarbonate layer which they protect. It has been found that in impact shock-resistant laminates utilizing such relatively brittle layers along with polycarbonate, the relatively brittle material cracks under impact causing the polycarbonate layers and particularly the rear-most polycarbonate layer to spall, causing damage to exposed objects behind the laminate. Such spalling occurs because of the so-called "notch sensitive" character of polycarbonates. Thus, if an overlying brittle layer is broken, the fracture lines propagate to the polycarbonate and act as "critical" notches causing the polycarbonate to fail in a brittle manner with little of the energy absorption typical of this normally impact-resistant material.

It will thus be seen that there is a need for providing impact shock resistant laminates using polycarbonate and overlying relatively more brittle material which are reduced in this so-called notch sensitivity, thus making them more useful from a practical point of view.

It is a primary object of the present invention to provide impact shock-resistant laminates using polycarbonate and overlying relatively more brittle material as the back layer wherein such notch sensitivity and the resultant tendency toward spalling and failure are reduced.

Briefly, according to the present invention it has been found that the notch sensitivity of the back polycarbonate layer coated with a relatively brittle coating in impact shock-resistant laminates is substantially reduced if the thickness of such layer is restricted to less than about 220 mils and preferably from about 30 to 150 mils. The minimum thickness of the polycarbonate back-ply is restricted only by current coating application technology and maintenance of good optics of the coated product. Thicknesses less than about 30 mils tend to be somewhat impractical.

The front or impact shock receiving layers may be selected from the group consisting of glass, polycarbonate, or solid resinous materials which may include epoxy, polyurethane, chlorinated aromatic ether, polyether sulfone, acrylic (polymethylmethacrylate) and rubber modified acrylics, polyarylsulfone, polystyrene, cellulose acetate butyrate, polyesters, bisphenol fluorenone polycarbonate, and phenolphthalein based polycarbonate, among others.

Any polycarbonate resin can be used as laminae for both the impact or shock receiving layers and also the back polycarbonate lamina including but not limited to those described in U.S. Pat. Nos. 3,161,615; 3,220,973; 3,312,659; 3,312,660; 3,313,777; 3,666,614, among others, all of which are included herein by reference. Any of the usual types of glass used in so-called safety applications can be used in conjunction with the present invention including coated or uncoated and chemically and thermally strengthened or tempered glass as well as common untempered glass where indicated. Preferably, these layers are transparent.

Where desirable, adhesion promoting primers can be used to promote adhesion, such material being well known and including, among others, vinyl alkoxy silanes, aminoalkylalkoxy silanes, alkoxy silanes, silyl peroxides and amino-alkoxy silanes, such materials being described in the above U.S. Pat. No. 3,666,614 and elsewhere. A present advantage is that primers are usually not necessary in connection with any polycarbonate or resin used although they can be used where indicated.

Any conventional adhesives may be used between the laminae including polyvinylbutyrals, ethylene terpolymers, epoxies, polyurethanes, silicones, acrylics, and ethylene acrylic acids, among others. The interlayer in contact with any polycarbonate ply and most specifically the polycarbonate back-ply must provide not only good adhesion but also must be chemically compatible with the sensitive polycarbonate. The preferred interlayer for contact with the polycarbonate laminae is a polysiloxane-polycarbonate block copolymer.

The polysiloxane-polycarbonate block copolymers can be expressed by the average formula

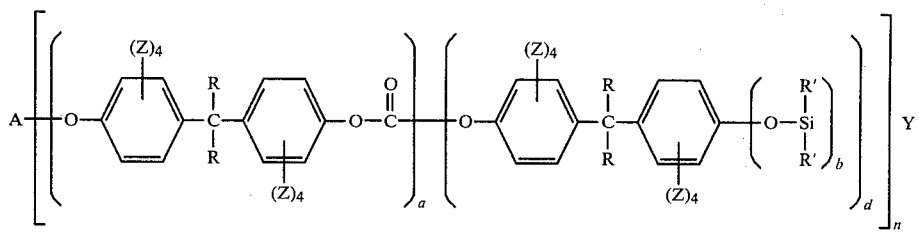

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, Y is

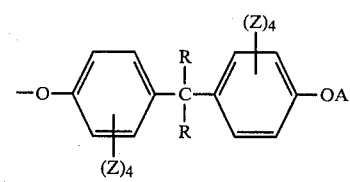

A is a member selected from the class of hydrogen and

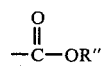

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and z is a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc; R can be all the same radical or any two or more of the aforementioned radicals, while R is preferably methyl, R' includes all radicals included by R above except hydrogen, where R' can also be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably 20° C. to 50° C., and in the presence of an acid acceptor, a mixture of a halogen chain-stopped polydiorganosiloxane having the formula

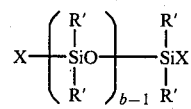

and a dihydric phenol having the formula

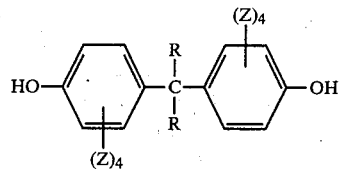

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 2 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 3 are, for example, 2,2-bis(4-hydroxyphenol)-propane (bisphenol-A); 2,4'-dihydroxydiphenylmethane; bis-(2-hydroxyphenyl)-methane; bis-(4-hydroxyphenyl)- methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular desired characteristics.

Illustrative of the above block copolymers is General Electric LR-3320. This material has a specific gravity of 1.12, tensile strength of 2500 to 3900 psi, an elongation of 230 to 430, a tear strength (Die C) of 400 lbs/in., and a brittleness temperature below −76° F. and a heat deflection temperature (10 mils under 66 psi Load) of 160° F.

Another such block copolymer, specifically General Electric LR-5530, has a specific gravity of 1.07, a tensile strength of 2200 to 2500 psi, an elongation of 500–700%, a tear (Die C) of 200 lbs/in., and a brittleness temperature below −76° F. and a heat deflection temperature (66 psi) of 130° F.

Where a polycarbonate layer without further description or designation is mentioned herein, it is the polycarbonate of bisphenol-A or 2,2-bis(4-hydroxyphenol)propane.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates a prior art laminate over which the present invention represents an improvement. There were laminated in an autoclave using a vacuum bag with a temperature of 250° F., a pressure of 240 to 250 psi and a hold time of 45 minutes a laminate consisting of strengthened primed glass 125 mils thick bonded by 60 mils of LR-5530 polysiloxane-polycarbonate block copolymer to a 250 mil sheet of polycarbonate bonded in turn through 30 mils of LR-3320 polysiloxane-polycarbonate block copolymer to a 375 mil thick layer of polycarbonate, the latter having a relatively more brittle mar-resistant coating on its back, exposed or inboard laminate surface. When a "Medium Power" bullet was fired at the glass surface in accordance with Underwriters Laboratory Standard for Bullet-Resisting Equipment, specifically UL 752, dated Feb. 23, 1973, at a temperature of 55° F., the exposed surface of the 375 mil polycarbonate ply or layer spalled in a brittle manner, although there was no bullet penetration, damaging cardboard indicators placed approximately about 18 inches behind the test laminate. This example illustrates the so-called notch sensitivity of the relatively thick polycarbonate layer when it is subjected to impact shock. Reference to various powered ammunition and other test materials are as specified in the above Standard.

EXAMPLE 2

Example 1 was repeated using a front or impact shock-resistant layer of 125 mils of strengthened primed glass bonded by means of 60 mils of LR-5530 block copolymer to a 500 mil thick layer of polycarbonate, the latter in turn being bonded utilizing an interlayer of 30 mils of LR-3320 block copolymer to a back layer or inboard layer of 125 mils of polycarbonate having a relatively more brittle mar-resistant or abrasion-resistant coating on its exposed surface. When a "Medium Power" bullet was fired from a super 38 automatic at the glass surface of this laminate at room temperature, at 55° F. and at 95° F., there was no penetration or spalling of the back or inboard polycarbonate ply. While it is not intended to be bound by any particular theory as to the efficacy of this particular laminate, it is believed that when the back or inboard polycarbonate ply coated with a relatively more brittle material is held to a thickness of less than 220 mils, and preferably between about 30 mils and about 150 mils, the layer so limited in thickness has sufficient flexibility to withstand the normal notch sensitive tendency of polycarbonates under such conditions.

EXAMPLE 3

This example illustrates another typical prior art impact shock-resistant laminate utilizing polycarbonate layers. There was prepared in an air autoclave using a vacuum bag at a temperature of 257° F., a pressure of 240 to 250 psi and a hold time of 30 minutes, a laminate having a front or impact shock receiving ply of 250 mils of polycarbonate with a relatively more brittle mar-resistant outer surface. This polycarbonate layer was bonded using a 20–25 mil thick layer of LR-3320 block copolymer to a 500 mil thick layer of polycarbonate bonded in turn by a similar thickness of LR-3320 block copolymer to a back ply of polycarbonate 250 mils thick, the latter ply having a relatively more brittle mar-resistant coating on its outer or downstream surface. The total thickness of this laminate was approximately 1 3/64" with a total polycarbonate thickness of 1". This laminate was tested in accordance with the above UL 752 Standard after the front outer surface was exposed to a temperature of −25° F. for a minimum of three hours, the inboard surface or back ply being exposed to ambient room temperature. When a "Medium Power" bullet was fired at the front ply, while there was no bullet penetration, a brittle punch-out type spall from the back or inboard polycarbonate surface caused damage to a cardboard indicator placed about 18 inches behind the laminate.

EXAMPLE 4

Example 3 was repeated using a front ply of 125 mils of polycarbonate with a mar-resistant coating on its outer surface bonded by 15 mils of LR-3320 block copolymer to 375 mils of polycarbonate bonded by 15 mils of LR-3320 block copolymer to 375 mils of polycarbonate bonded again by 15 mils of LR-3320 block copolymer to a back-ply of 125 mils polycarbonate having a relatively more brittle mar-resistant coating on its outside surface. The total thickness of this laminate was approximately 1 3/64" with a total polycarbonate thickness of 1". When this laminate was tested as in Example 3, there was no brittle spalling or penetration with "Medium Power" bullets. Thus, the same overall thickness of polycarbonate which failed the UL test by virtue of spall in Example 3 was resistant to spall in this example because of the reduced thickness of the back-ply. This laminate has the further virtue of being resistant to spall regardless of direction of impact as it is symmetrical with both mar-resistant coated polycarbonate outer plies of controlled thickness.

EXAMPLE 5

Example 3 was repeated using a front ply of 500 mils of polycarbonate with a mar-resistant coating on its outer surface bonded by 15 mils of LR-3320 block copolymer to 500 mils of polycarbonate bonded again with 15 mils of LR-3320 block copolymer to a back-ply of polycarbonate 60 mils thick having a relatively more brittle mar-resistant coating on both of its surfaces. When this laminate was tested as in Example 3, there was no brittle spalling or projectile penetration with the first two "Medium Power" bullet impacts. With the third bullet placed closely to the other two, there was some sign of a slight ductile fracture although a brittle notch failure did not result.

EXAMPLE 6

There was prepared in an air autoclave using a peripherally disposable vacuum bag or ring at a temperature of 257° F., a pressure of 190 to 210 psi with a 15-minute hold time, maintaining a constant vacuum from initial preparation to final cool-down and depressurization, a laminate having an impact shock-receiving layer of 250 mils of polycarbonate with a relatively more brittle mar-resistant outer surface. This polycarbonate layer was bonded using 15 mils of LR-3320 block copolymer to a 500 mil layer of polycarbonate bonded with 15 mils of LR-3320 block copolymer to another 500 mil layer of polycarbonate bonded in turn again using 15 mils of LR-3320 block copolymer to a back-ply of polycarbonate 93 mils thick having a relatively more brittle mar-resistant coating on both of its surfaces. When this laminate was tested in accordance with the above UL 752 Standard using a "High Power" or .357 magnum ammunition, there was no penetration or spalling of the back-ply or inboard layer. However, when the ammunition was increased to "Super Power" or .44 magnum, there was a slight cracking of the back layer and a slight spall on the third shot at −25° F., marring a cardboard indicator placed 15 inches behind the back ply.

EXAMPLE 7

Example 6 was repeated except that the back or inboard 93 mils thick polycarbonate layer had a relatively more brittle mar-resistant coating only on its outside surface. When this laminate was tested as in Example 6, there was no spalling even using the .44 magnum or "Super Power" ammunition. Once again, this example as compared to Example 6 illustrates the efficacy of having a relatively more brittle mar-resistant layer only on the outside of the inboard polycarbonate ply or layer. This example, while illustrating the efficacy of the present invention, does indicate that most preferably the inboard polycarbonate ply should have a relatively more brittle mar- or abrasion-resistant coating only on its outer surface if even a ductile type fracture is to be avoided. In such ductile type fractures the back polycarbonate ply is torn especially with higher powered ammunition. While the adhesion of the back ply to the rest of the laminate can be increased during manufacture as by increasing the fabrication time, cycle temperature or pressure, a convenient way of obviating such ductile fracture is, as pointed out above, to limit the relatively more brittle mar-resistant layer to only the outer or exposed surface of the back polycarbonate ply.

EXAMPLE 8

A laminate was made using polymethyl methacrylate 125 mils thick and 125 mils thick annealed polycarbonate with an interlayer of 15 mils of LR-3320. The polycarbonate had a mar-resistant coating on its outer surface. Prior to lamination, the polycarbonate was treated for 4 hours at 285° F. and allowed to cool overnight. The laminate was prepared in a steam heated platen press starting at 100° F. and raising the temperature to 275° F. for 30 minutes at 200 psi, cooling for 5 minutes to ambient under 200 psi pressure. To prevent sideways extrusion of the acrylic edge guides were used as a mold. This three-ply laminate was further modified to bond the acrylic surface to 125 mil thick potassium ion exchanged soda lime glass utilizing a cast-in-place acrylic-based interlayer system. The cast-in-place techniques utilized were standard state of the art with an overnight room temperature cure. The resulting 5-ply laminate was resistant to three, 12 gauge rifled ⅞ ounce slugs fired from a distance of 10 feet into the glass face of the laminate. There was no spall from the mar-resistant 125 mil polycarbonate back ply.

There are provided, then, by the present invention improved impact shock-resistant laminates which overcome any notch sensitivity tendency of polycarbonate layers when overlaid with relatively more brittle material on the side opposite the impact receiving direction. The invention further makes possible and practical laminates of the type described which are not only improved in impact resistance but are resistant to marring and scratching and similar abuse which detracts from clarity or transparency when such laminates are used as windshields, windows, view ports, glazing and the like. Heating elements or detection means such as wires, films and the like well known to those skilled in the art can also be incorporated in the present structures.

What is claimed is:

1. Impact or shock resistant laminate comprising a plurality of impact or shock receiving layers selected from the group consisting of polycarbonates, glasses, and solid resinous materials other than polycarbonates, including a back polycarbonate lamina opposite the direction of impact or shock, said back polycarbonate lamina having a mar-resistant coating 0.05 to 1 mils thick and which is harder and relatively more brittle than the underlying polycarbonate layer opposite the direction of impact, said back polycarbonate lamina having a thickness from about 30 mils to about 220 mils, the laminae being bonded together by a compatible adhesive.

2. A laminate according to claim 1 wherein at least the back polycarbonate lamina is bonded to the adjacent lamina with an adhesive of block polysiloxanepolycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon, linkages wherein each of the silicon atoms has two organo radicals attached through a carbon-silicon bond, and (B) a dihydric phenol having the formula

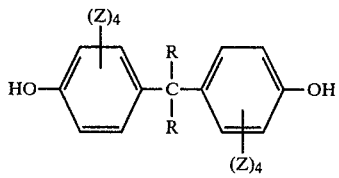

where Z is a member selected from the class consisting of hydrogen, lower alkyl radicals and halogen radicals and combinations thereof, and R is a member selected from the class consisting of hydrogen, hydrocarbon and halogenated radicals, and phosphenating the purified reaction product.

3. A laminate as in claim 1 wherein the solid resinous material is acrylic based.

4. A laminate as in claim 1 wherein the mar-resistant coating is limited to the outer or exposed laminate surfaces.

5. A laminate as in claim 1 which is symmetrical having outer plies of polycarbonate of controlled thickness coated with mar-resistant coating.

6. Impact shock resistant laminate comprising a front or impact shock resistant layer selected from the group consisting of glass and polycarbonate and a plurality of polycarbonate laminae including a back polycarbonate lamina opposite the direction of impact or shock, said back polycarbonate lamina having a 0.05 to 1 mils thick mar-resistant coating harder and relatively more brittle than the underlying polycarbonate layer opposite the direction of impact, said back polycarbonate lamina having a thickness of from about 30 mils to about 220 mils, the laminae of said laminate being adhered together with interlayers of a block polysiloxane-polycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

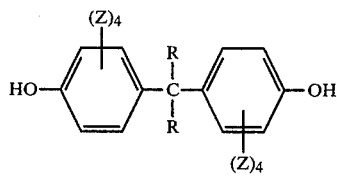

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product.

7. A laminate as in claim 6 wherein said back polycarbonate layer is from about 30 mils to about 150 mils thick.

8. A laminate as in claim 6 wherein said impact shock receiving layer is glass.

9. A laminate as in claim 6 wherein the impact shock receiving layer is a polycarbonate.

10. A laminate as in claim 6 wherein said back polycarbonate layer is coated on both sides with said mar-resistant coating.

* * * * *